United States Patent
Wu et al.

(10) Patent No.: US 11,831,795 B2
(45) Date of Patent: Nov. 28, 2023

(54) WIRELESS TRANSCEIVING DEVICE

(71) Applicant: HTC Corporation, Taoyuan (TW)

(72) Inventors: Chun-Yih Wu, Taoyuan (TW);
Ta-Chun Pu, Taoyuan (TW);
Yen-Liang Kuo, Taoyuan (TW)

(73) Assignee: HTC Corporation, Taoyuan (TW)

( * ) Notice: Subject to any disclaimer, the term of this patent is extended or adjusted under 35 U.S.C. 154(b) by 511 days.

(21) Appl. No.: 17/198,267

(22) Filed: Mar. 11, 2021

(65) Prior Publication Data

US 2021/0329110 A1     Oct. 21, 2021

Related U.S. Application Data

(60) Provisional application No. 63/010,703, filed on Apr. 16, 2020.

(51) Int. Cl.
| | | |
|---|---|---|
| *H04M 1/02* | (2006.01) | |
| *G02B 1/00* | (2006.01) | |
| *G02B 7/02* | (2021.01) | |
| *G02B 7/14* | (2021.01) | |
| *G02B 5/00* | (2006.01) | |

(52) U.S. Cl.
CPC .......... *H04M 1/0264* (2013.01); *G02B 1/002* (2013.01); *G02B 5/00* (2013.01); *G02B 7/021* (2013.01); *G02B 7/14* (2013.01)

(58) Field of Classification Search
CPC ........................ H04M 1/0264; H04M 1/72412; G02B 1/002; G02B 7/021; G02B 7/14; H04B 1/38; H04B 1/40; H04B 7/0408; H04N 23/663; G03B 17/04
See application file for complete search history.

(56) References Cited

U.S. PATENT DOCUMENTS

| | | | | |
|---|---|---|---|---|
| 2014/0266900 A1* | 9/2014 | Kasher | ................. | H04B 7/0848 |
| | | | | 342/372 |
| 2015/0097983 A1* | 4/2015 | Kim | ...................... | H04N 23/663 |
| | | | | 348/222.1 |
| 2019/0058824 A1* | 2/2019 | Eshita | ................ | H04M 1/72412 |
| 2021/0231915 A1* | 7/2021 | Barros | ................. | A45C 13/002 |

FOREIGN PATENT DOCUMENTS

CN            110086002 A   *   8/2019    ............... H01Q 1/12

OTHER PUBLICATIONS

Office Action of China Counterpart Application, dated Apr. 18, 2022, pp. 1-7.

* cited by examiner

*Primary Examiner* — Clayton E. LaBalle
*Assistant Examiner* — Diana Hancock
(74) *Attorney, Agent, or Firm* — JCIPRNET

(57) ABSTRACT

A wireless transceiving device including a main body and at least one camera lens is provided. The camera lens is detachably connected to a connection part on the main body. The camera lens includes a barrel part, a first lens, a phase matching structure, a data storage device, and an electrical connection terminal. The data storage device is configured to store specification information. When the camera lens is connected to the connection part, a wireless transmitter is coupled to the data storage device through the electrical connection terminal and reads the specification information in the data storage device. The wireless transmitter controls a plurality of transmitting phases and a plurality of transmitting powers of a plurality of transmitted wave beams according to the specification information.

15 Claims, 8 Drawing Sheets

WIRELESS TRANSCEIVING DEVICE

CROSS-REFERENCE TO RELATED APPLICATION

This application claims the priority benefit of U.S. Provisional Application No. 63/010,703, filed on Apr. 16, 2020. The entirety of the above-mentioned patent application is hereby incorporated by reference herein and made a part of this specification.

BACKGROUND

Technical Field

The disclosure relates to a wireless transceiving device, and more particularly, to a wireless transceiving device which may adaptively control a transmitting phase and a transmitting power of a wave beam.

Description of Related Art

In the related art, a transceiving device applied to the Wireless Gigabit Alliance (WiGig) protocols is designed to provide a high-speed connection for laptops to perform data and image access operations. Hence, the radiation of an antenna thereof is directed to a specific direction (e.g., projecting toward a projector in front of the laptop). However, in display technologies of virtual reality, the coverage characteristics of the wave beams transmitted by the transceiving device vary depending on the user's placement position. For this reason, in the related art, high-complexity antennas are arranged to promote the variability of transmission field patterns. This approach leads to a substantial increase in product costs.

SUMMARY

The disclosure provides a wireless transceiving device, which may optimize the control on a wave beam transmitted by a camera lens.

The wireless transceiving device of the disclosure includes a main body and at least one camera lens. The main body has at least one connection part and at least one corresponding wireless transmitter. The camera lens is detachably connected to the connection part. The camera lens includes a barrel part, a first lens, a phase matching structure, a data storage device, and an electrical connection terminal. The first lens is disposed on a first side in the barrel part. The phase matching structure is disposed on a second side in the barrel part. The data storage device is disposed in the barrel part and is configured to store specification information. The electrical connection terminal is disposed in the barrel part and is coupled to the data storage device. When the camera lens is connected to the connection part, the wireless transmitter is coupled to the data storage device through the electrical connection terminal and reads the specification information in the data storage device. The wireless transmitter controls a plurality of transmitting phases and a plurality of transmitting powers of a plurality of transmitted wave beams according to the specification information.

Based on the above, the wireless transceiving device of the disclosure is provided with one or more detachable camera lenses. The camera lens is provided with the data storage device. When the camera lens is connected to the main body of the wireless transceiving device, the data storage device provides the specification information. The wireless transmitter may control the plurality of transmitting phases and the plurality of transmitting powers of the plurality of transmitted wave beams according to the specification information, so that the wireless transceiving device may transmit the wave beams according to the specification of each camera lens and improve the transmission performance of wireless signals.

DESCRIPTION OF THE EMBODIMENTS

Figure 1:
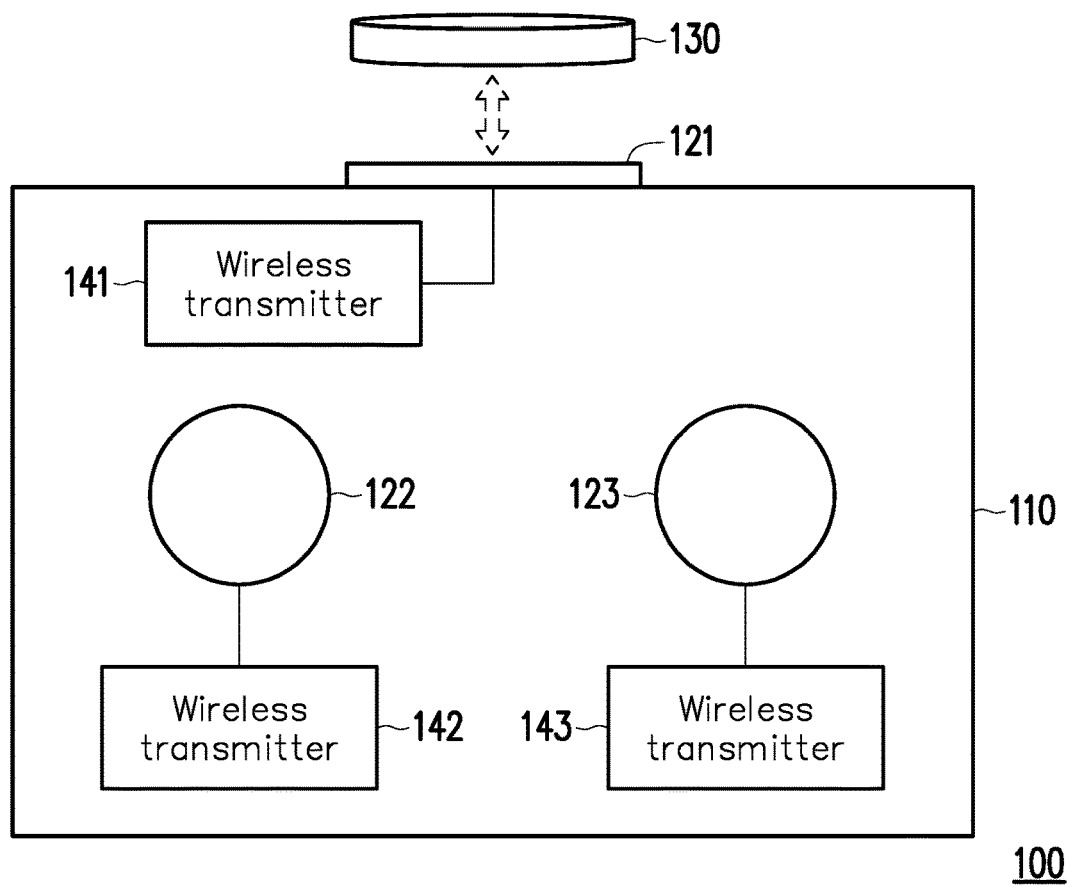
FIG. 1 shows a schematic view of a wireless transceiving device according to an embodiment of the disclosure.

Referring to FIG. 1, FIG. 1 shows a schematic view of a wireless transceiving device according to an embodiment of the disclosure. A wireless transceiving device 100 includes a main body 110 and a camera lens 130. The main body 110 has connection parts 121 to 123 and corresponding wireless transmitters 141 to 143. The camera lens 130 and the connection part 121 are detachably connected to each other. The camera lens 130 includes a plurality of lenses and a data storage device. When the camera lens 130 is connected to the main body 110 through the connection part 121, the data storage device may be electrically connected to the corresponding wireless transmitter 141. The data storage device is configured to store specification information of the camera lens 130. The wireless transmitter 141 may read the specification information stored in the data storage device, and may control transmitting phases and transmitting powers of a plurality of transmitted wave beams according to the specification information. The wireless transmitter 141 may read the specification information in the data storage device through any form of communication interface. For example, the wireless transmitter 141 may perform data transmission through a serial interface (e.g., a serial peripheral interface (SPI)). In the embodiment, the specification information of the camera lens 130 includes a lens type of the camera lens 130, a focal length of the camera lens 130, and a size of a field of view of the camera lens 130. When the camera lens 130 has a movable lens that is configured to adjust the focal length, the specification information may further include a position of the movable lens.

It is noted that the wireless transceiving device 100 may have one or more connection parts, and the connection parts are respectively configured to detachably connect one or more camera lenses. The number of connection parts and the number of camera lenses shown in FIG. 1 are only examples for illustration, and do not limit the scope of the disclosure.

Figure 2:
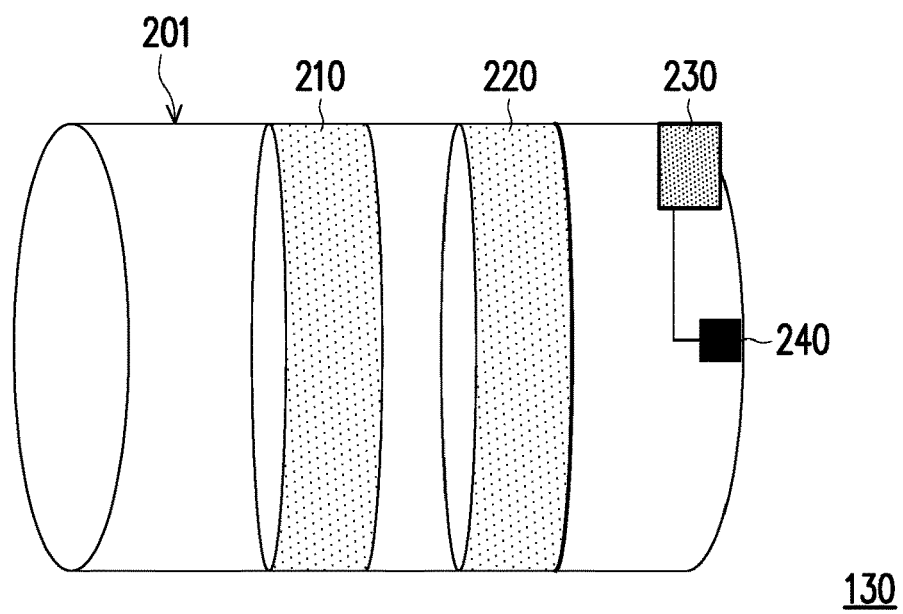
FIG. 2 shows a schematic view of an implementation of a camera lens in a wireless transceiving device according to an embodiment of the disclosure.

Regarding the implementation details of the camera lens 130, reference may be made to FIG. 2, which shows a schematic view of an implementation of the camera lens in the wireless transceiving device according to an embodiment of the disclosure. The camera lens 130 includes a barrel part 201, a lens 210, a phase matching structure 220, a data storage device 230, and an electrical connection terminal 240. The lens 210 is disposed on a first side in the barrel part 201, and the phase matching structure 220 is disposed on a second side in the barrel part 201 opposite to the first side. The electrical connection terminal 240 is disposed at a position in the camera lens 130 that may be in contact with the connection part 121 on the main body 110 of the wireless transceiving device 100. The connection part 121 may be provided with a conductive material at a position corresponding to the electrical connection terminal 240, and may be connected to the wireless transmitter 141 through a transmission wire. When the camera lens 130 is connected to the connection part 121, the wireless transmitter 141 may be electrically connected to the electrical connection terminal 240.

In addition, the data storage device 230 is electrically connected to the electrical connection terminal 240, and the data storage device 230 may be electrically connected to the wireless transmitter 141 when the wireless transmitter 141 is electrically connected to the electrical connection terminal 240.

In the embodiment, the lens 210 may be a convex lens or another lens in any form. The lens 210 is a millimeter wave lens (which is operable at a millimeter-wave frequency band or above). In addition, the phase matching structure 220 may be constructed as any phase matching structure that is known to persons skilled in the art, and is not particularly limited herein.

In the embodiment, a position of the phase matching structure 220 may be adjusted. The phase matching structure 220 may be adjusted to be positioned close to or away from the lens 210, and is not required to be fixed at a specific position.

Figure 3A:
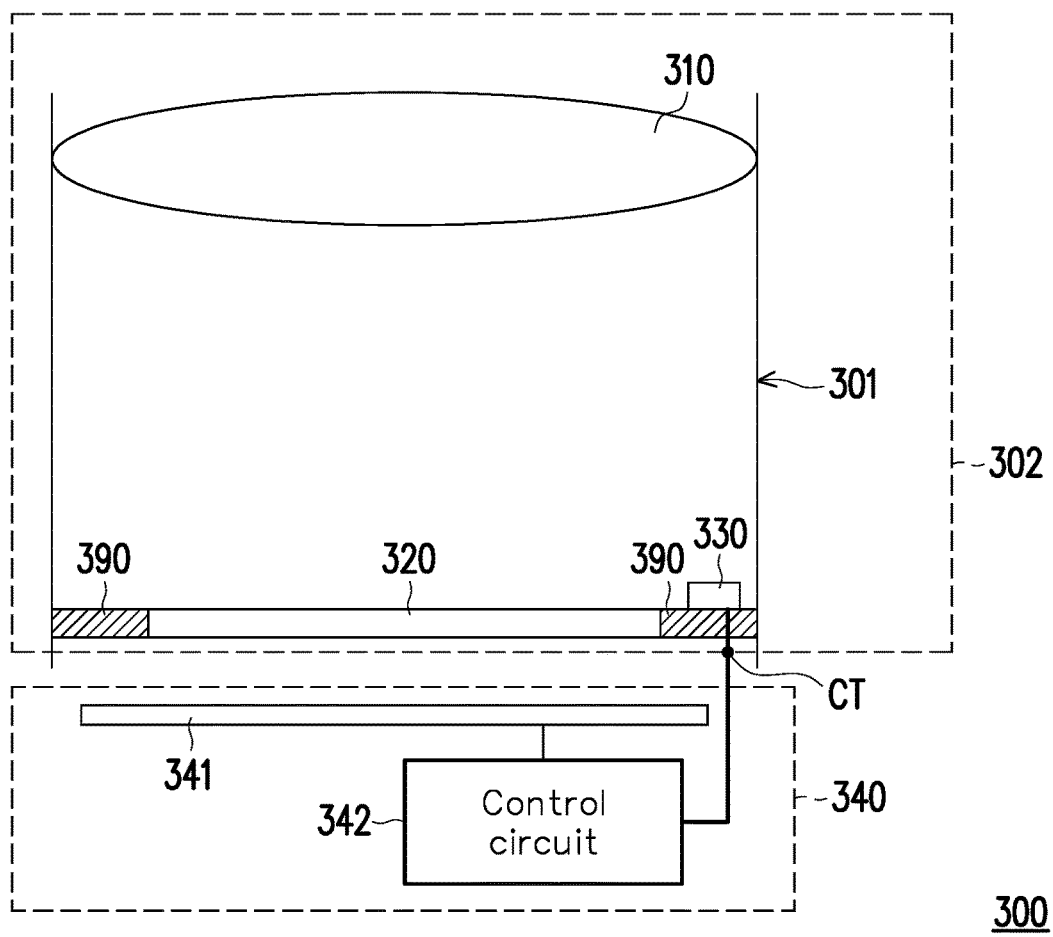
FIG. 3A shows a schematic view of a wireless transceiving device according to another embodiment of the disclosure.
Figure 3B:
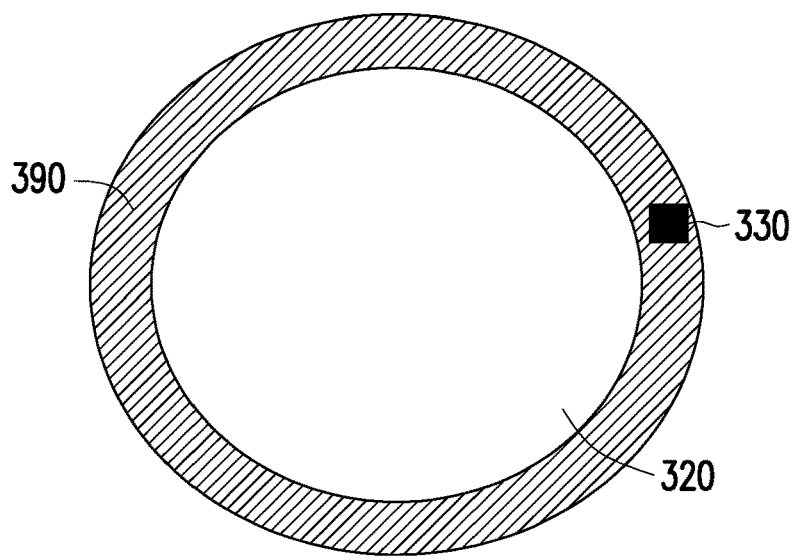
FIG. 3B shows a top view of a phase matching structure and a printed circuit board of the embodiment of FIG. 3A of the disclosure.

Referring to FIG. 3A and FIG. 3B, FIG. 3A shows a schematic view of a wireless transceiving device according to another embodiment of the disclosure, and FIG. 3B shows a top view of a phase matching structure and a printed circuit board of the embodiment of FIG. 3A of the disclosure. A wireless transceiving device 300 includes a camera lens 302 and a wireless transmitter 340. The camera lens 302 includes a barrel part 301, a lens 310, a phase matching structure 320, a printed circuit board 390, and a data storage device 330.

The lens 310, the phase matching structure 320, the printed circuit board 390, and the data storage device 330 are disposed in the barrel part 301. In the embodiment, the printed circuit board 390 is configured to carry the data storage device 330. A hollow part is formed in the printed circuit board 390, and the phase matching structure 320 may be disposed in the hollow part.

Herein, referring to FIG. 3B, the printed circuit board 390 may have an annular shape, and the hollow part is formed in the center thereof. The data storage device 330 may be a memory chip and may be disposed on the printed circuit board 390. The hollow part formed in the printed circuit board 390 may be configured to arrange the phase matching structure 320.

Referring to FIG. 3A again, when the camera lens 302 is connected to a main body of the wireless transceiving device 300, the data storage device 330 may be connected to the wireless transmitter 340 through an electrical connection terminal CT. In the embodiment, the wireless transmitter 340 includes an antenna 341 and a control circuit 342. The control circuit 342 may be electrically connected to the data storage device 330 through the electrical connection terminal CT. The control circuit 342 may perform a reading operation on the data storage device 330 to obtain the specification information about the camera lens 302 that is stored in the data storage device 330.

Further, the control circuit 342 controls transmitting phases and transmitting powers of wave beams transmitted by the antenna 341 according to the read specification information. In detail, based on lookup information, the control circuit 342 may obtain the transmitting phases and the transmitting powers of the wave beams according to the specification information. The lookup information may be stored in a memory embedded in the control circuit 342 or may be stored in a memory outside the control circuit 342, and is not particularly limited herein. The lookup information may include information about the transmitting phases and the transmitting powers of the wave beams to be transmitted corresponding to a plurality of lenses of different specifications. In the embodiment, the transmitting phase of a wave beam may be a phase shift between the wave beam to be transmitted and a reference direction. The reference direction may be a normal direction of the antenna 341.

In the embodiment, the lookup information may be an antenna codebook. The antenna codebook records a signal intensity and a signal phase that are fed into each array element of a corresponding antenna. In the antenna codebook, there may be N antenna sub-codebooks that respectively correspond to N antennas (where N is a positive integer). The data recorded in the antenna codebook may be digital data, and the signal intensity and the signal phase of the corresponding antenna may be indicated by using a multi-bit digital code.

Additionally, when the camera lens 302 is detached to be physically separated from the wireless transmitter 340, the control circuit 342 may detect a detached state of the data storage device 330 and thereby stop the antenna 341 from transmitting the wave beams.

Figure 4A:
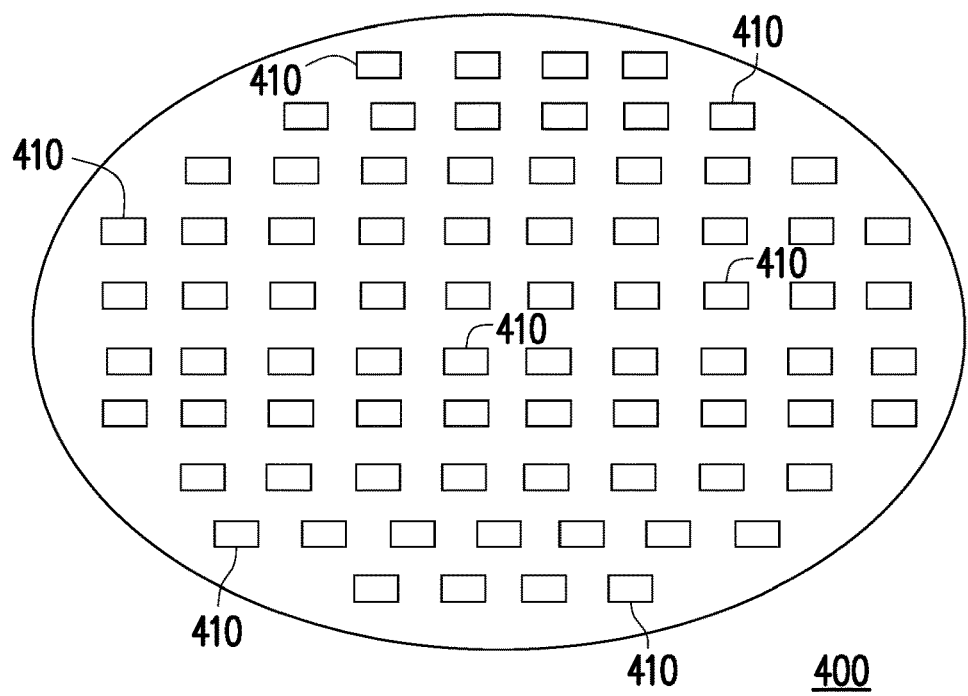
FIG. 4A to FIG. 4B show schematic views of a phase matching structure of a wireless transceiving device according to multiple embodiments of the disclosure.
Figure 4B:
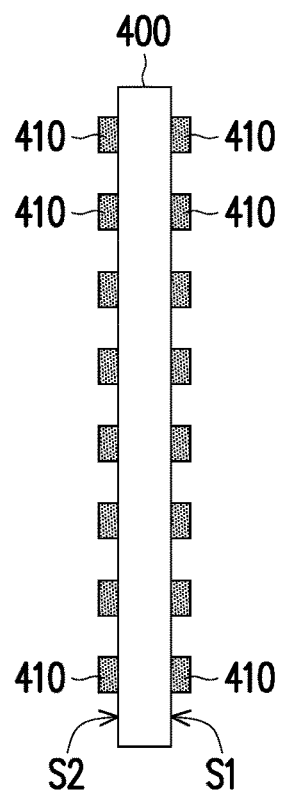

Regarding the implementation details of the phase matching structure, reference may be made to FIG. 4A and FIG. 4B, which show schematic views a phase matching structure of a wireless transceiving device according to multiple embodiments of the disclosure. FIG. 4A shows a top view of a phase matching structure 400. The phase matching structure 400 may have a plurality of metalized structures 410. The structures 410 may be arranged in an array. Specifically, the structures 410 may be arranged on the phase matching structure 400 according to a predetermined sequence. In the embodiment of the disclosure, a distance between any two adjacent structures 410 is less than a quarter of a wavelength of a corresponding wave beam. The frequency of the wave beam is, for example, 60 GHz.

In the embodiment, the structure 410 may be a protruding structure or a groove structure.

In FIG. 4B, the structure 410 may be formed on a first surface S1 of the phase matching structure 400, or may be formed on both the first surface S1 and a second surface S2 of the phase matching structure 400 that are opposite to each other. The first surface S1 of the phase matching structure 400 may face a lens (e.g., the lens 310 in the embodiment of FIG. 3) in a lens barrel.

In other embodiments of the disclosure, the phase matching structure may also be implemented by using convex lenses; alternatively, the phase matching structure may also be formed by using a plurality of liquid crystal display lattices.

In an implementation example in which the phase matching structure is formed by using the plurality of liquid crystal display lattices, the liquid crystal display lattice may receive an electrical signal and provide a phase matching function according to the electrical signal. The corresponding camera lens may be provided with a drive circuit. The drive circuit generates the electrical signal according to the specification information stored in the data storage device so as to drive the liquid crystal display lattice.

In other embodiments of the disclosure, the phase matching structure of liquid crystal display lattices may be configured to overlap with the phase matching structure that has metalized structures, so that a phase matching performance of a generated beam of light may be effectively improved.

Figure 5:
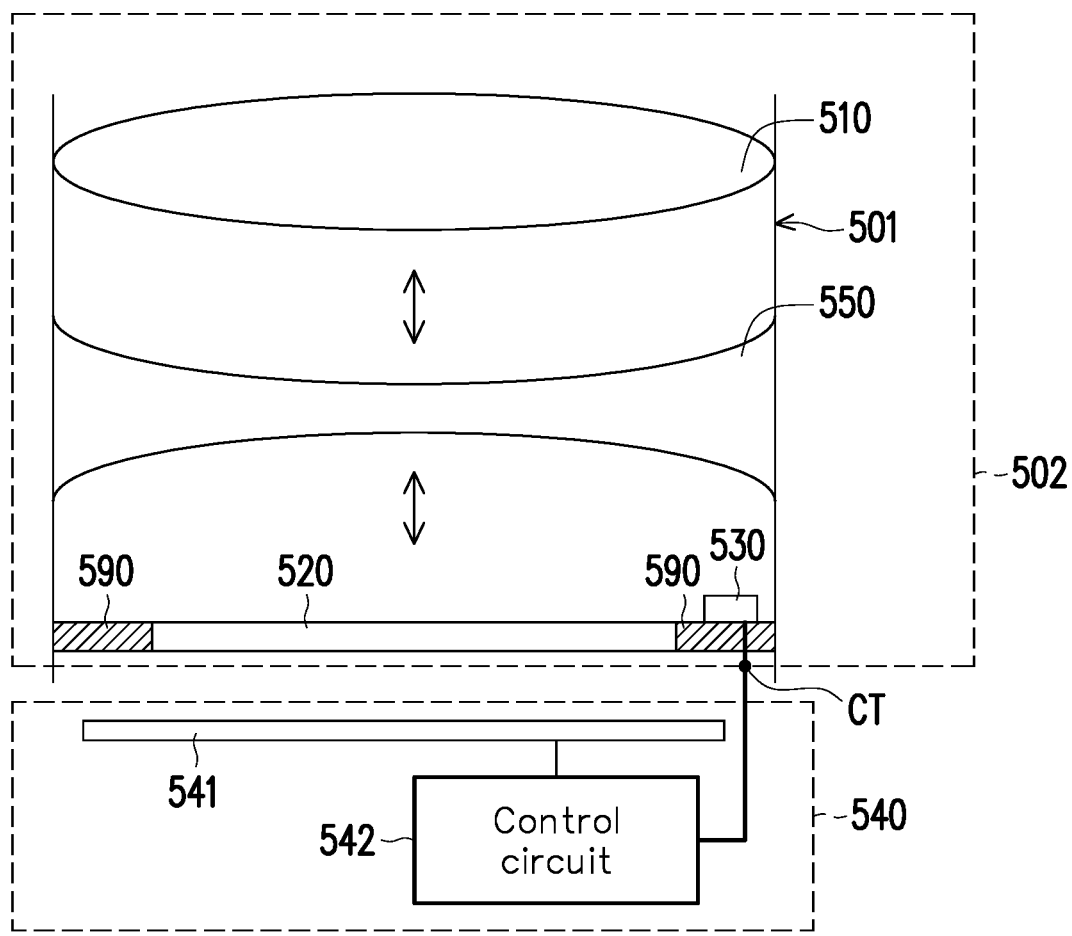
FIG. 5 shows a schematic view of a wireless transceiving device according to another embodiment of the disclosure.

Referring to FIG. 5, FIG. 5 shows a schematic view of a wireless transceiving device according to another embodiment of the disclosure. A wireless transceiving device 500 includes a camera lens 502 and a wireless transmitter 540. The camera lens 502 includes a barrel part 501, lenses 510 and 550, a phase matching structure 520, a printed circuit board 590, and a data storage device 530. The lenses 510 and 550, the phase matching structure 520, the printed circuit board 590, and the data storage device 530 are disposed in the barrel part 501. The wireless transmitter 540 includes an antenna 541 and a control circuit 542. When the camera lens 502 is connected to a main body of the wireless transceiving device 500, the control circuit 542 may be electrically connected to the data storage device 530 through an electrical connection terminal CT. The data storage device 530 may be a memory chip on the printed circuit board 590.

Different from the embodiment of FIG. 3A, in this embodiment, the lens 550 is further disposed in the camera lens 502 as a focal length adjustment lens. An overall focal length of the camera lens 502 may be adjusted by adjusting a position of the lens 550. In the embodiment, the position of the lens 550 may be included in the specification information and may be stored in the data storage device 530. In the embodiment, the lenses 510 and 550 are respectively a convex lens and a concave lens.

Additionally, in other embodiments of the disclosure, the lenses 510 and 550 may be replaced respectively by a converging planar meta-lens and a diverging planar meta-lens.

Figure 6:
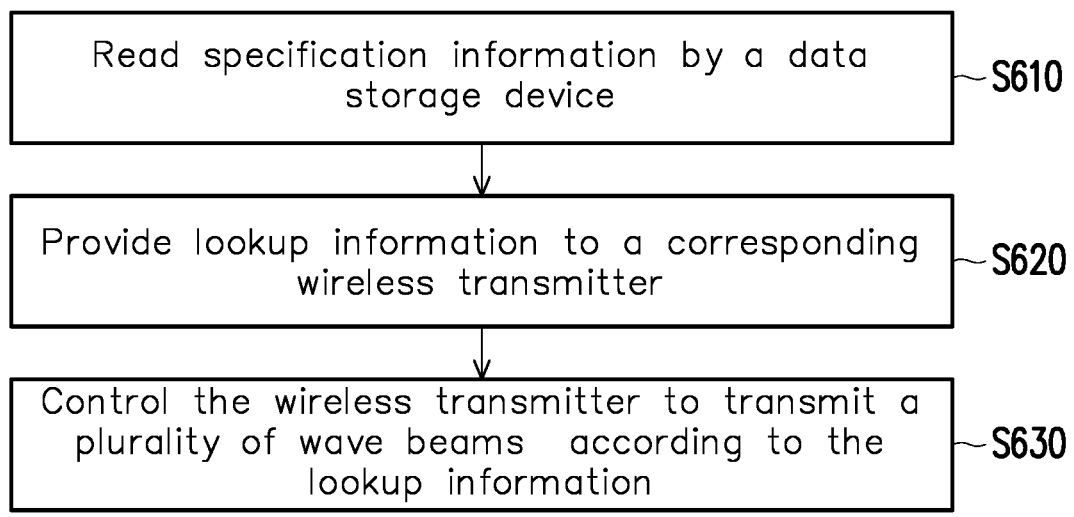
FIG. 6 shows a flowchart of an operation of a wireless transceiving device according to an embodiment of the disclosure.

Referring to FIG. 6, FIG. 6 shows a flowchart of an operation of a wireless transceiving device according to an embodiment of the disclosure. First, when the camera lens is connected to the main body of the wireless transceiving device, the data storage device in the camera lens may be electrically connected to the wireless transmitter through the electrical connection terminal. Next, in step S610, the wireless transmitter may perform a data reading operation on the data storage device through the electrical connection terminal. Next, in step S620, the lookup information is provided to the corresponding wireless transmitter. In step S630, the wireless transmitter transmits a plurality of wave beams according to the lookup information and is configured to control transmitting phases and transmitting powers of the wave beams.

The implementation details of steps S610 to S630 have been described in detail in the aforementioned embodiments and examples and will not be repeated herein.

Figure 7A:
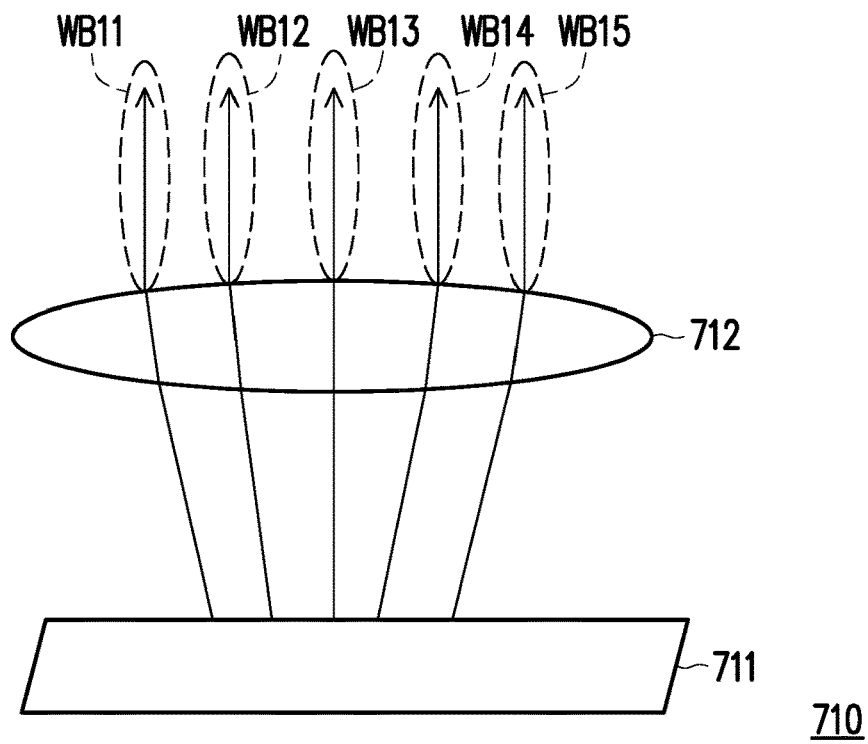
FIG. 7A and FIG. 7B respectively show schematic views of wave beams that are transmitted by wireless transceiving devices according to multiple embodiments of the disclosure.
Figure 7B:
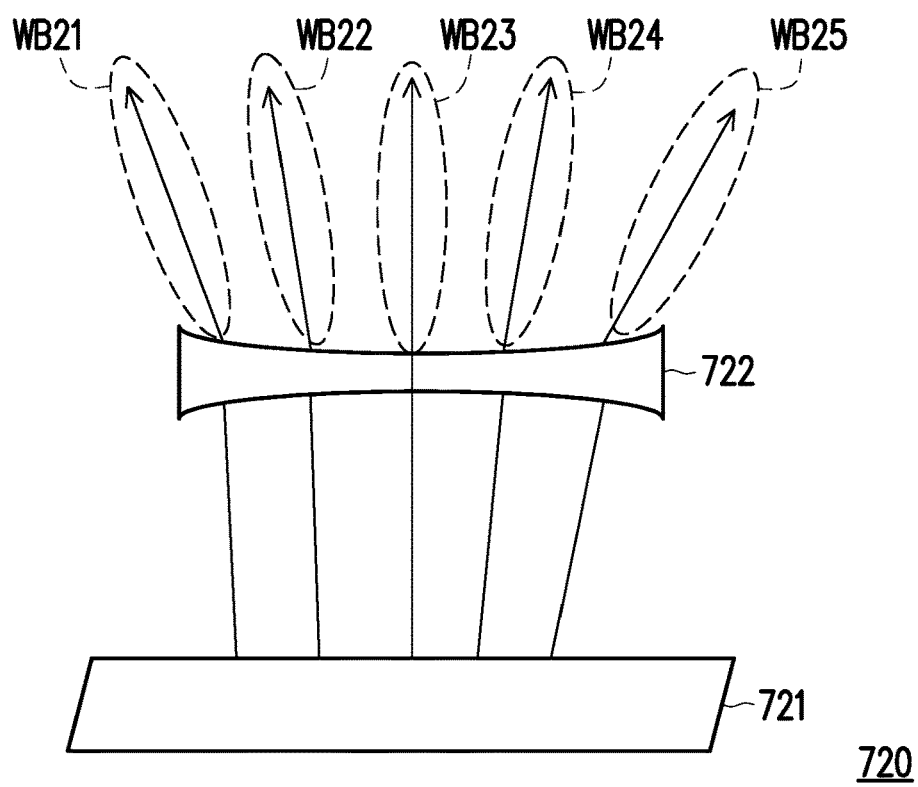

Referring to FIG. 7A and FIG. 7B, FIG. 7A and FIG. 7B respectively show schematic views of wave beams that are transmitted by wireless transceiving devices according to multiple embodiments of the disclosure. In FIG. 7A, an antenna 711 in a wireless transceiving device 710 may control transmitting phases and transmitting powers of wave beams WB11 to WB15 that are transmitted by the antenna 711 according to specification information provided by a camera lens. In this embodiment, a convex lens 712 is disposed in a barrel part of the camera lens. The camera lens may transmit the convergent wave beams WB11 to WB15 through the refraction of the convex lens 712.

In FIG. 7B, an antenna 721 in a wireless transceiving device 720 may control transmitting phases and transmitting powers of wave beams WB21 to WB25 that are transmitted by the antenna 721 according to specification information provided by a camera lens. In this embodiment, a concave lens 722 is disposed in a barrel part of the camera lens. The camera lens may transmit the divergent wave beams WB21 to WB25 through the refraction of the concave lens 722.

According to the embodiments of FIG. 7A and FIG. 7B, the wireless transceiving device of the disclosure may be configured with camera lenses of different specifications so that the transmitting phases and powers of the wave beams can be set according to the specification information of each camera lens in response to different usage requirements. Therefore, the performance of the wireless transceiving device can be improved.

Figure 8A:
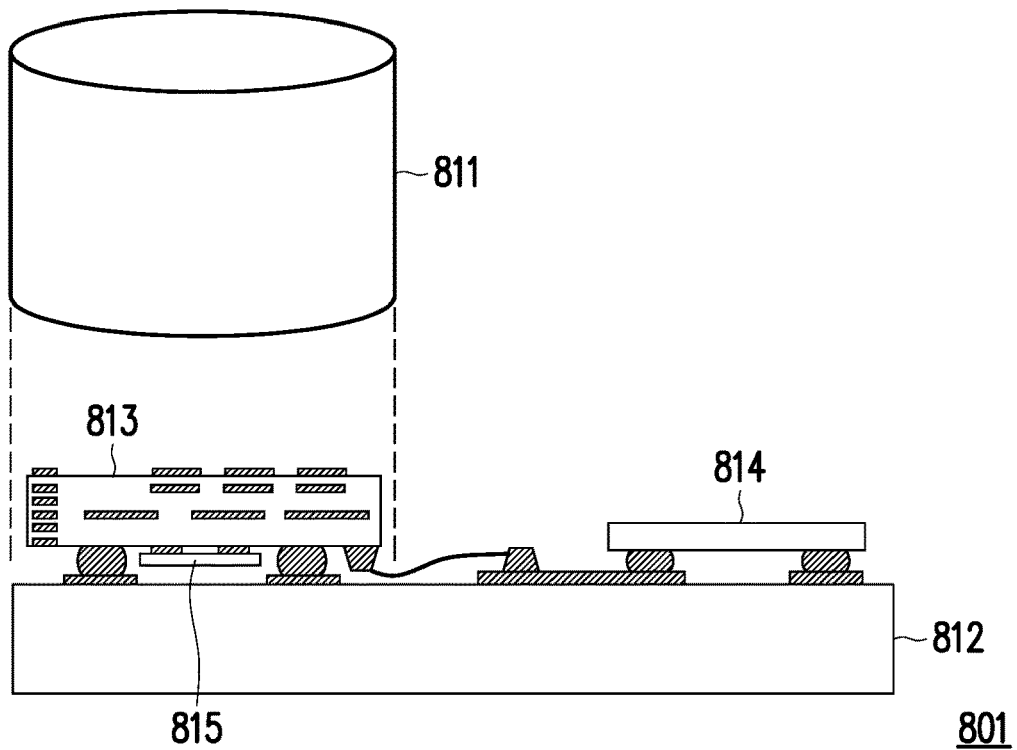
FIG. 8A to FIG. 8C show schematic views of a structure of a wireless transceiving device according to an embodiment of the disclosure.
Figure 8B:
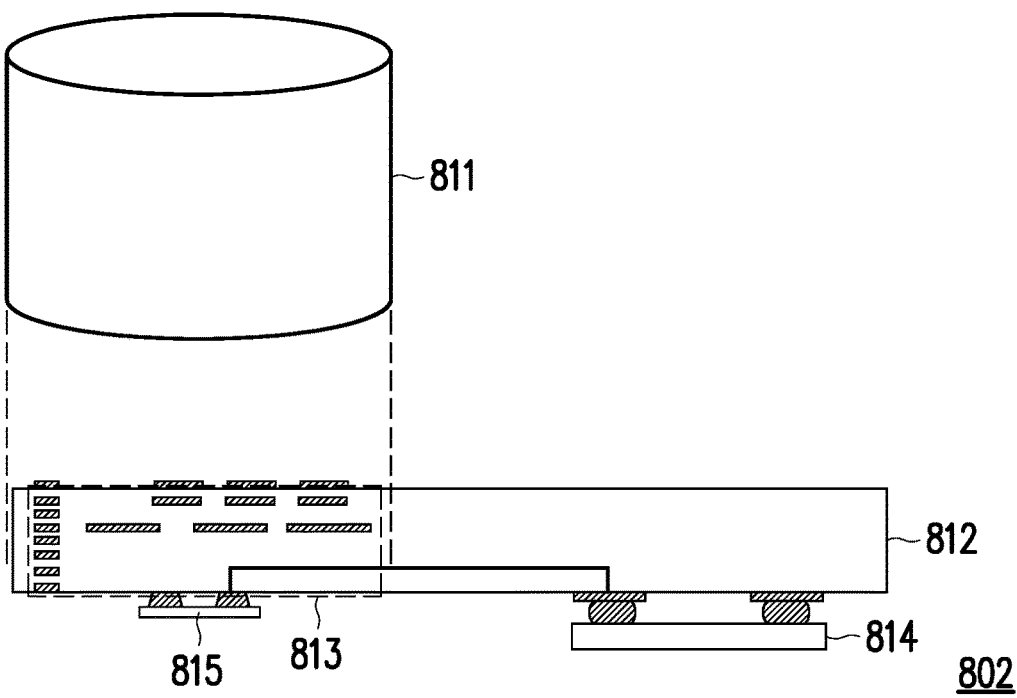
Figure 8C:
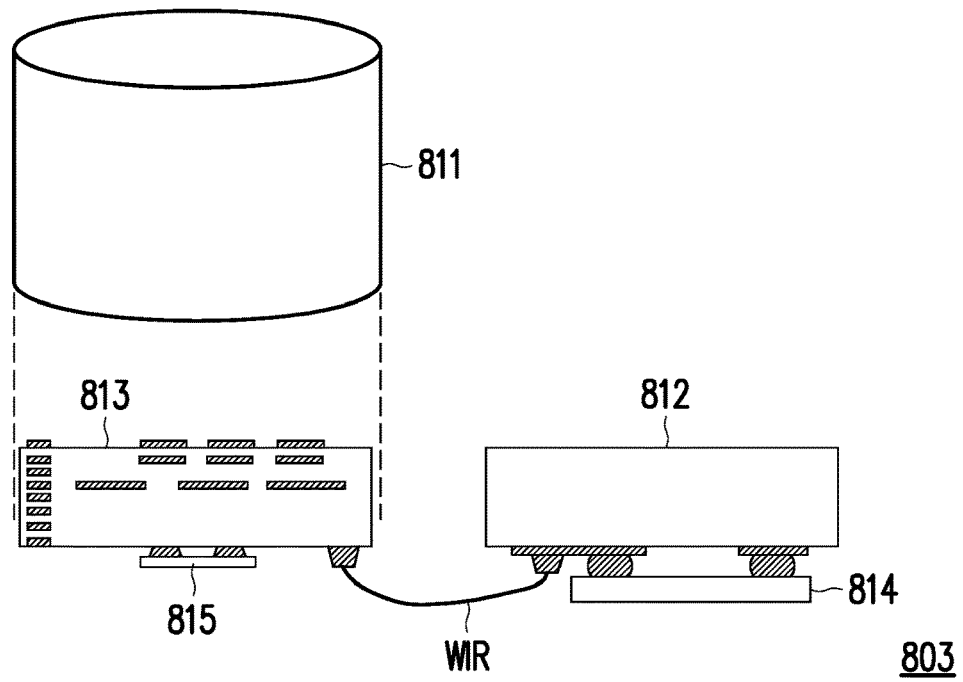

Referring to FIG. 8A to FIG. 8C, FIG. 8A to FIG. 8C show schematic views of a structure of a wireless transceiving device according to an embodiment of the disclosure. In FIG. 8A, a wireless transceiving device 801 includes a camera lens 811 and a main body. The main body is configured with a carrier board 812, an antenna module 813, and an integrated circuit 814. The antenna module 813 may be provided with one or more antennas, and the antennas may form a phased antenna array. The antenna module 813 further has a radio frequency control circuit 815 that is configured to generate a plurality of wave beams through the phased antenna array.

The integrated circuit 814 is carried on the carrier board 812. The antenna module 813 is also disposed on the carrier board 812. The radio frequency control circuit 815 may be disposed on a backboard of the antenna module 813, and the antenna module 813 is located in an orthographic projection region of the camera lens 811 on the carrier board 812. In the embodiment, the integrated circuit 814 may be disposed on any surface of the carrier board 812 and is not particularly limited herein.

In FIG. 8B, in a wireless transceiving device 802, the antenna module 813 may be embedded on the carrier board 812, and the phased array antenna may face the camera lens 811. The antenna module 813 may also be located in an orthographic projection region of the camera lens 811 on the carrier board 812. In this embodiment, the radio frequency control circuit 815 is disposed on a backboard of the carrier board 812, and the integrated circuit 814 may also be disposed on any surface of the carrier board 812 and is not particularly limited herein.

In FIG. 8C, in a wireless transceiving device 803, the antenna module 813 is not disposed on the carrier board 812.

The antenna module 813 may be electrically connected to the carrier board 812 through a wire WIR. The antenna module 813 is also located in an orthographic projection region of the camera lens 811. The radio frequency control circuit 815 is disposed on the backboard of the antenna module 813. The carrier board 812 carries the integrated circuit 814. The integrated circuit 814 may also be disposed on any surface of the carrier board 812 and is not particularly limited.

Figure 9A:
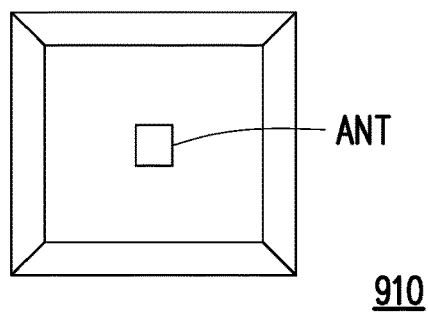
FIG. 9A and FIG. 9B show schematic views of an antenna module in a wireless transceiving device according to an embodiment of the disclosure.
Figure 9B:
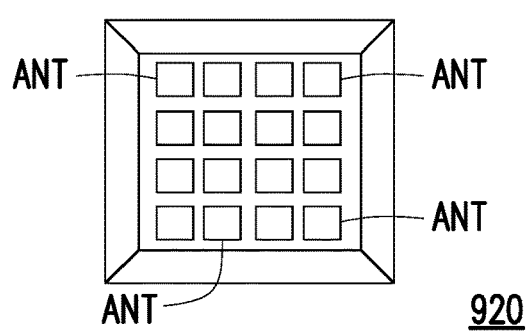

Referring to FIG. 9A and FIG. 9B, FIG. 9A and FIG. 9B show schematic views of an antenna module in a wireless transceiving device according to an embodiment of the disclosure. In FIG. 9A, a single antenna ANT may be disposed on an antenna module 910. Alternatively, in FIG. 9B, a plurality of antennas ANT may be disposed on an antenna module 920 and form a phased array antenna.

It is noted that in all the embodiments of the disclosure, the antenna modules are all configured with hardware circuits.

In summary of the above, the wireless transceiving device of the disclosure may be detachably connected with one or more camera lenses through the connection parts, and may perform data transmission with the connected camera lens to generate the corresponding wave beams according to the specification information provided by the camera lens. As a result, the wireless transceiving device of the disclosure may adaptively control the transmitting phases and the transmitting powers of the transmitted wave beams for the camera lenses of different specifications. The performance of the wireless transceiving device may be further improved, especially in applications to the fifth-generation mobile communication technology.

What is claimed is:

1. A wireless transceiving device, comprising:
a main body having at least one connection part and at least one corresponding wireless transmitter; and
at least one camera lens detachably connected to the at least one connection part, the at least one camera lens comprising:
a barrel part;
a first lens disposed on a first side in the barrel part;
a phase matching structure movably disposed on a second side in the barrel part;
a data storage device disposed in the barrel part and configured to store specification information; and
an electrical connection terminal disposed in the barrel part and coupled to the data storage device.

2. The wireless transceiving device according to claim 1, wherein when the at least one camera lens is connected to the at least one connection part, the at least one wireless transmitter is coupled to the data storage device through the electrical connection terminal and reads the specification information in the data storage device, wherein the at least one wireless transmitter controls a plurality of transmitting phases and a plurality of transmitting powers of a plurality of transmitted wave beams according to the specification information.

3. The wireless transceiving device according to claim 1, wherein the at least one wireless transmitter comprises:
at least one antenna; and
a control circuit coupled to the antenna and controlling the plurality of transmitting phases and the plurality of transmitting powers of the plurality of wave beams transmitted by the antenna according to the specification information.

4. The wireless transceiving device according to claim 3, wherein the control circuit obtains the plurality of transmitting phases and the plurality of transmitting powers of the plurality of wave beams according to the specification information based on lookup information.

5. The wireless transceiving device according to claim 4, wherein the lookup information is recorded in a memory.

6. The wireless transceiving device according to claim 1, wherein the at least one camera lens further comprises:
a second lens disposed between the first lens and the phase matching structure, wherein the second lens is configured to adjust a focal length of the at least one camera lens.

7. The wireless transceiving device according to claim 6, wherein the specification information comprises a lens type, the focal length, and a size of a field of view of the at least one camera lens, and a position of the second lens.

8. The wireless transceiving device according to claim 6, wherein the second lens is a concave lens and the first lens is a convex lens, or the second lens is a diverging planar meta-lens and the first lens is a converging planar meta-lens.

9. The wireless transceiving device according to claim 1, wherein the at least one camera lens comprises:
a printed circuit board disposed in the barrel part and configured to carry the data storage device, wherein a hollow part is formed in the printed circuit board, and the phase matching structure is disposed in the hollow part.

10. The wireless transceiving device according to claim 1, wherein a plurality of metalized structures are provided on a first surface and/or a second surface of the phase matching structure, and the plurality of structures are arranged in an array.

11. The wireless transceiving device according to claim 10, wherein a distance between any two adjacent ones of the structures is less than a quarter of a wavelength of each of the plurality of wave beams.

12. The wireless transceiving device according to claim 1, wherein the phase matching structure is a convex lens.

13. The wireless transceiving device according to claim 1, wherein the phase matching structure has a plurality of liquid crystal display lattices.

14. The wireless transceiving device according to claim 1, wherein the main body further comprises:
a carrier board;
an antenna module comprising an antenna, wherein the antenna module is disposed on the carrier board, embedded in the carrier board, or coupled to the carrier board; and
an integrated circuit disposed on the carrier board and configured to be coupled to the antenna module.

15. The wireless transceiving device according to claim 14, wherein the antenna module has a radio frequency control circuit, and the radio frequency control circuit is electrically coupled to the integrated circuit.

* * * * *